United States Patent

[11] 3,617,318

[72] Inventor Leonard John Minnick
  Cheltenham, Pa.
[21] Appl. No. 790,425
[22] Filed Jan. 10, 1969
[45] Patented Nov. 2, 1971
[73] Assignee G. & W. H. Corson, Inc.
  Plymouth Meeting, Pa.

[54] MAGNESIA-CONTAINING REFRACTORY PRODUCTS AND METHODS OF MAKING SAME
20 Claims, No Drawings

[52] U.S. Cl. .................................................... 106/58, 106/63
[51] Int. Cl. .................................................... C04b 35/06
[50] Field of Search .................................... 106/58, 61, 63

[56] References Cited
UNITED STATES PATENTS

| | | | |
|---|---|---|---|
| 1,751,234 | 3/1930 | Garnett ........................ | 106/61 |
| 3,210,205 | 10/1965 | Shurtz ......................... | 106/63 |
| 3,275,461 | 9/1966 | Davies et al. ................. | 106/58 |
| 3,487,147 | 12/1969 | Wuhrer ........................ | 106/61 |

Primary Examiner—James E. Poer
Attorney—Howson and Howson

ABSTRACT: A refractory batch mix in which the refractory grain consists essentially of an intimate mixture of (1) selectively calcined dolomite in which the calcium exists substantially as calcium carbonate and the magnesium exists substantially as magnesium oxide, and (2) at least one magnesia-containing grain selected from the group consisting of periclase and dead-burned dolomite.

MAGNESIA-CONTAINING REFRACTORY PRODUCTS AND METHODS OF MAKING SAME

BACKGROUND OF THE INVENTION

In recent years the refractory industry has developed basic refractory compositions particularly for use in the linings of the basic oxygen steel-making furnace. One of the principal refractory materials in such compositions has been dead-burned dolomite prepared by subjecting raw dolomite to high temperatures whereby the calcium carbonate and magnesium carbonate are converted to their respective oxides. Periclase has also been included in such refractory compositions, and this has been prepared by calcining magnesite to a dead-burned condition or by calcining magnesium hydroxide obtained, for example, from the sea water process. Such compositions have been used in unshaped form, as in mortars, tamping or ramming mixes for filling, patching, and the like; or in the form of shaped bodies, e.g. brick. The brick may be fired or unfired, and may or may not be tar bonded or tar impregnated. The particle size of the grain is important and is normally provided by crushing, screening and blending in a manner adapted to produce a graded material ranging in size and from 4 mesh on down.

The use of dead-burned dolomite has involved several problems. In the first place, the preparation of the dead-burned dolomite grain involves costly processing steps because of the high temperatures required. In the second place, but of major importance, dead-burned dolomite is unstable on standing under normal atmospheric conditions, as in stockpiles. This involves hydration of the calcium oxide which results in degradation of original particles into small particles consisting of calcium hydroxide and magnesium oxide. Thus, on standing, the grain size distribution continues to change and the structural properties of the grain are affected deleteriously. Moreover, calcium hydroxide has a lower density than calcium oxide and decomposes at high temperatures, such as in the furnace or during burning of the brick, forming pores and inducing shrinkage. Thus, depending upon the length of time of storage; the atmospheric conditions, principally humidity; the size of the stock pile (hydration occurs from the outside of a stockpile inwardly,) and the size of the particles (hydration occurs from the outside of a particle inwardly), there may be wide variations in the nature of the material in any given stock pile and from brick to brick and from batch to batch in the products made therefrom.

Attempts to overcome this difficulty have involved the installation of expensive air conditioning equipment and storage buildings.

It is the principal object of the present invention to provide a novel magnesia-containing refractory material.

It is another object of the present invention to provide a novel magnesia-containing refractory material in which the foregoing difficulties or problems can be reduced or largely eliminated.

It is another object of the present invention to provide a magnesia-containing refractory composition in which one of the magnesia-containing refractory grains is less expensive to prepare than dead-burned dolomite.

It is a further object of the present invention to provide a novel magnesia-containing refractory composition in which one of the magnesia-containing refractory grains is stable on storage even under widely varying atmospheric conditions.

These and other objects, including the provision of methods for making novel magnesia-containing refractory compositions, will become apparent from a consideration of the following specification and claims.

SUMMARY OF THE INVENTION

The magnesia-containing refractory composition of the present invention is one in which the refractory grain consists essentially of an intimate mixture of (1) selectively calcined dolomite in which the calcium exists substantially as calcium carbonate and the magnesium exists substantially as magnesium oxide, and (2) at least one magnesia-containing grain selected from the group consisting of periclase and dead-burned dolomite, the selectively calcined dolomite being present in an amount between about 10 and about 80 percent, by weight, based on the total weight of said refractory grain, substantially all of said refractory grain being −4 mesh and at least about 30 percent of said selectively calcined dolomite being 30 50 mesh.

It has been found that selectively calcined dolomite can be used in conjunction with periclase and/or dead-burned dolomite to prepare highly valuable basic refractory compositions. The selectively calcined dolomite is less expensive to prepare than is dead-burned dolomite since it requires much lower calcining conditions. Of importance is the fact that the selectively calcined dolomite is very stable upon storage for extended periods of time under widely varying atmospheric conditions in that it will not hydrate under such conditions. Hence, to the extent that it replaces dead-burned dolomite or periclase in refractory compositions, the cost of the final refractory product is reduced, and to the extent it replaces dead-burned dolomite, difficulties due to nonuniformity in the dead-burned dolomite grain (through hydration and degradation on storage) are reduced or eliminated.

Selectively calcined dolomite is known and is prepared by heating dolomitic limestone at a moderately elevated temperature sufficient to convert substantially all of the magnesium carbonate portion to magnesium oxide but insufficient to convert any substantial amount of the calcium carbonate to calcium oxide. Dolomitic limestone contains calcium carbonate and magnesium carbonate and in an approximately 1:1 molar ratio, the proportion of each varying, depending upon the source, from about 40 to about 60 percent on a molar basis. Preferably, the dolomite has a purity of at least about 95 percent; that is to say, will contain a total of at least about 95 percent CaO+MgO on a fully calcined basis. As stated, the selectively calcined dolomite is prepared by calcining dolomitic limestone at a moderately elevated temperature. Magnesium carbonate decomposes to magnesium oxide at about 1,300° F., and if long calcining times are available, a temperature at or slightly above this may be used. However, the faster the calcining operation and the larger the pieces of dolomitic limestone, the higher the temperature conditions employed. Thus, in some cases, temperatures as high as about 1,700° F. may be reached in the limestone. These temperatures, however, are much lower than those required for substantially complete calcination of the dolomitic limestone to calcium oxide and magnesium oxide.

As stated, the other principal component of the refractory composition of the present invention will be periclase or dead-burned dolomite or a mixture of these. Periclase, as is well known, is essentially magnesium oxide as produced by dead-burning natural magnesite, magnesium carbonate or magnesium hydroxide, such as the products obtained by the sea water process. Dead-burned dolomite is also well known and is prepared by calcining dolomitic limestone at a temperature well above that sufficient to convert both the calcium carbonate and the magnesium carbonate to their respective oxides.

In the refractory compositions of the present invention, the selectively calcined dolomite will make up at least 10 percent, by weight, based on the total weight of the refractory grain. A proportion as high as about 80 percent thereof may be employed, although, in most cases, the amount of the selectively calcined dolomite will not exceed about 60 percent. In accordance with preferred practice, the selectively calcined dolomite will make up between about 30 and about 50 percent, by weight, based on the total weight of the refractory grain.

In the refractory compositions of the present invention, substantially all of the grain will be −4 mesh (Tyler). In accordance with conventional refractory practice, there will be a size gradation. Thus, it is preferred that from about 30 to about 70 percent, by weight, of the refractory grain be −4+50 mesh and the balance (from about 70 to about 30 percent) be −50 mesh. It has been found that at least about 30 percent of the selectively calcined dolomite should have a particle size greater than 50 mesh, and, in accordance with preferred practice, at least about 50 percent of the selectively calcined dolomite will have a particle size greater than 50 mesh.

The composition of the present invention may be used in essentially unshaped form. For example, it may be tempered with water to form a mortar or rammed or tamped into place to form a monolithic structure. The preparation of unshaped mixes from magnesia-containing refractory grain is well known and the general procedures applicable there are likewise applicable to the present invention.

On the other hand, the composition may be prepared and used in the form of a shaped body, such as a brick. The brick may be unburned and chemically bonded or it may be burned (fired) to develop a ceramic bond among the refractory grain size of the fired product is uniform and reproducible from batch to batch.

The invention will be more readily understood from a consideration of the following specific examples which are given for the purpose of illustration only and are not to be considered as limiting the scope of the invention: EXAMPLES 1–8

In these examples periclase and selectively calcined dolomite are blended in various proportions as set forth in table I. The periclase contains 95–96 percent MgO, and the selectively calcined dolomite has a mol ratio of $CaCO_3$: MgO of approximately 1:1 and contains 95–96 percent $CaCO_3$+MgO.

In table I are set forth the proportions (in weight percent based on the total weight of periclase and selectively calcined dolomite) of each material in the given particle size range (mesh, Tyler):

TABLE I

| Example | Periclase | | | | | | | | Selectively calcined dolomite | | | | | | | | P/D* |
|---|---|---|---|---|---|---|---|---|---|---|---|---|---|---|---|---|---|
| | −4 +8 | −8 +16 | −16 +30 | −30 +50 | −50 +100 | −100 +200 | −200 +325 | −325 | −4 +8 | −8 +16 | −16 +30 | −30 +50 | −50 +100 | −100 +200 | −200 +325 | −325 | |
| 1 | 5.7 | 14.7 | 9.4 | 10.3 | 7.5 | 10.9 | 8.8 | 22.7 | 10.0 | | | | | | | | 90/10 |
| 2 | | 10.4 | 9.4 | 10.3 | 7.5 | 10.9 | 8.8 | 22.7 | 15.7 | 4.3 | | | | | | | 80/20 |
| 3 | | 0.4 | 9.4 | 10.3 | 7.5 | 10.9 | 8.8 | 22.7 | 15.7 | 14.3 | | | | | | | 70/30 |
| 4 | | | | 10.1 | 7.5 | 10.9 | 8.8 | 22.7 | 15.7 | 14.7 | 9.4 | 0.2 | | | | | 60/40 |
| 5 | | | | 0.1 | 7.5 | 10.9 | 8.8 | 22.7 | 15.7 | 14.7 | 9.4 | 10.2 | | | | | 50/50 |
| 6 | | | | | | 8.5 | 8.8 | 22.7 | 15.7 | 14.7 | 9.4 | 10.3 | 7.5 | 2.4 | | | 40/60 |
| 7 | | | | | | | 7.3 | 22.7 | 15.7 | 14.7 | 9.4 | 10.3 | 7.5 | 10.9 | 1.5 | | 30/70 |
| 8 | | | | | | | | 20.0 | 15.7 | 14.7 | 9.4 | 10.3 | 7.5 | 10.9 | 8.8 | 2.7 | 20/80 |

*Weight ratio of periclase to selectively calcined dolomite.

particles. The preparation of unburned, chemically bonded brick and also of burned brick, from magnesia-containing refractory grain, is well known and the general procedures applicable there are likewise applicate to the present invention. For example, in preparing burned brick from the composition of the present invention, the composition is pressed, either in dry form or after tempering with water and a temporary binder, into brick form and the brick shape is fired at a temperature ranging from about 2,600° to about 3,500° F. depending upon the particular kiln employed and hence the time available. During such firing calcium carbonate in the selectively calcined dolomite decomposes to calcium oxide.

The composition of the present invention is particularly applicable for the preparation of well-known tar-containing brick. In this case, either one of two generally well-known procedures may be followed: (1) tar may be mixed with the composition following which the mixture is pressed into brick form; the resulting brick may be heated to drive off volatiles; (2) a burned brick may be initially prepared following which the brick is impregnated with molten tar to prevent subsequent hydration of calcium oxide. In the latter case, a vacuum-pressure sequence during which the brick is placed in a chamber which is evacuated, molten tar is admitted to the chamber and the vacuum released and pressure applied to force the molten well into the brick, as well as to coat the surface, is usually employed. The term "tar" as used in this context is used in the generic sense to include pitches, resins and like protective materials which decompose (coke) to carbon upon heating. The amount of "tar" generally ranges up to about 15 percent by weight, based on the weight of the refractory grain, depending upon the particular material used.

The compositions of the present inventions may be used as linings, patching material, and the like, in refractory-lined apparatus where high temperatures are encountered such as retorts, furnaces, kilns, and the like.

Since the compositions of the present invention contain calcium carbonate which will decompose at high temperatures, some shrinkage will occur at high temperatures depending upon the relative proportion of the selectively calcined dolomite in the product. However, in the proportions called for herein, there is no deleterious warping or cracking of the product under such temperature conditions. In the preparation of fired brick, any shrinkage involved can be compensated for by employing an oversized mold so that the ultimate Each of the foregoing mixes is dry blended after which a temporary binder (4 percent molasses and 4 percent water, by weight, and based on 100 parts of the dry mix) is added and mixed therewith. Each damp mix, in an amount of 350 g. is placed in a 4½×2 ¼-inch brick mold and pressed at 10,000 p.s.i. for 10 minutes. After removal from the mold, each specimen is dried at 100° C. for 16 hours and then fired at 3,000° F. for 3–3½ hours.

Data obtained are set forth in the following table II:

TABLE II

| Example | 1 | 2 | 3 | 4 | 5 | 6 | 7 | 8 |
|---|---|---|---|---|---|---|---|---|
| Unfired formed brick height (in.) | .74 | .76 | .79 | .81 | .84 | .86 | .88 | .90 |
| Linear shrinkage on firing, percent | .23 | .23 | .23 | 1.34 | 2.23 | 5.33 | 8.89 | 12.44 |
| Fired density (g./cc.) | 2.51 | 2.34 | 2.16 | 2.16 | 2.09 | 2.03 | 2.12 | 2.22 |

The fired brick of examples 1–6 show no warping or cracking, while those of examples 7 and 8 show some warping that might, however, not be objectionable in some applications.

In similar fashion, a part or all of the periclase in the foregoing mixed may be replaced by dead-burned dolomite.

EXAMPLES 9–12

The fired brick of examples 2,3, 4 and 5 are impregnated with pitch by placing the brick in a sealed chamber, evacuating the chamber and then admitting molten pitch having a melting point of about 160° F., under pressure until the brick are impregnated with 10–15 percent, by weight, of the pitch.

EXAMPLE 13

In this example are mixed 40 parts, by weight, of the selectively calcined dolomite used in the preceding examples, (but half is −4+50 mesh and half is −50+100 mesh, Tyler); and 60 parts of the periclase as used in the preceding examples, but half of which is −16+100 mesh and the other half −100 mesh. Specimens are pressed, dried and fired as in examples 1–8 to provide excellent brick exhibiting a shrinkage on firing of 0.4–6 percent (linear) and 1.3–1.9 percent (volumetric).

Modification is possible in the selection of selectively calcined dolomite, periclase and dead-burned dolomite as well as in the selection of binders, if used, "tar," if used, and proportions and processing techniques without departing from the scope of the present invention.

What is claimed is:

1. A refractory batch mix of refractory grain in which the refractory grain consists essentially of an intimate mixture of (1) selectively calcined dolomite in which the calcium of said dolomite exists substantially as calcium carbonate and the magnesium of said dolomite exists substantially as magnesium oxide, and (2) at least one magnesia-containing grain selected from the group consisting of periclase and dead-burned dolomite, said selectively calcined dolomite being present in an amount between about 10 and about 80 percent, by weight, based on the total weight of said refractory grain, substantially all of said refractory grain being −4 mesh and at least about 30 percent of said selectively calcined dolomite being +50 mesh.

2. The refractory batch mix of claim 1 wherein said selectively calcined dolomite is present in amount less than 60 percent.

3. The refractory batch mix of claim 2 wherein said selectively calcined dolomite is present in an amount between about 30 and about 50 percent.

4. The refractory batch mix of claim 1 wherein at least about 50 percent of said selectively calcined dolomite is +50 mesh.

5. The refractory batch mix of claim 2 wherein at least about 50percent of said selectively calcined dolomite is +50 mesh.

6. The refractory batch mix of claim 3 wherein at least about 50 percent of said selectively calcined dolomite is +50 mesh.

7. The refractory batch mix of claim 1 wherein from about 30 to about 70 percent of said refractory grain is −4 +50 mesh and the remainder is −50 mesh.

8. The refractory batch mix of claim 2 wherein from about 30 to about 70 percent of said refractory grain is −4+50 mesh and the remainder is −50 mesh.

9. The refractory batch mix of claim 3 wherein from about 30 to about 70 percent of said refractory grain is −4 +50 mesh and the remainder is −50 mesh.

10. The refractory batch mix of claim 4 wherein from about 30 to about 70 percent of said refractory grain is −4+50 mesh and the remainder is −50 mesh.

11. The refractory batch mix of claim 5 wherein from about 30 to about 70 percent of said refractory grain is −4+50 mesh and the remainder is −50 mesh.

12. The refractory batch mix of claim 6 wherein from about 30 to about 70 percent of said refractory grain is −4+50 mesh and the remainder is −50 mesh.

13. The method of making a magnesia-containing refractory brick which comprises pressing into brick form refractory batch mix of refractory grain in which the refractory grain consists essentially of an intimate mixture of (1) selectively calcined dolomite in which the calcium of said dolomite exists substantially as calcium carbonate and the magnesium of said dolomite exists substantially as magnesium oxide, and (2) at least one magnesia-containing grain selected from the group consisting of periclase and dead-burned dolomite, said selectively calcined dolomite being present in an amount between about 10 and about 80 percent, by weight, based on the total weight of said refractory grain, substantially all of said refractory grain being −4 mesh and at least about 30 percent of said selectively calcined dolomite being +50 mesh.

14. The method of making a magnesia-containing refractory brick which comprises pressing into brick form a refractory batch mix of refractory grain in which the refractory grain consists essentially of an intimate mixture of (1) selectively calcined dolomite in which the calcium of said dolomite exists substantially as calcium carbonate and the magnesium of said dolomite exists substantially as magnesium oxide, and (2) at least one magnesia-containing grain selected from the group consisting of periclase and dead-burned dolomite, said selectively calcined dolomite being present in an amount between about 30 and about 50 percent, by weight, based on the total weight of said refractory grain, from about 30 to about 70 percent of said refractory grain being −4+50 mesh and the remainder +50 mesh and at least about 50 percent of said selectively calcined dolomite is +50 mesh.

15. The method of claim 13 wherein tar is mixed with said refractory grain before pressing.

16. The method of claim 14 wherein tar is mixed with said refractory grain before pressing.

17. The method of claim 13 wherein said brick form is fired.

18. The method of claim 14 wherein said brick form is fired.

19. The method of claim 17 wherein the resulting fired brick is impregnated with molten tar.

20. The method of claim 18 wherein the resulting fired brick is impregnated with molten tar.

UNITED STATES PATENT OFFICE
CERTIFICATE OF CORRECTION

Patent No. 3,617,318        Dated January 26, 1972

Inventor(s) Leonard John Minnick

It is certified that error appears in the above-identified patent and that said Letters Patent are hereby corrected as shown below:

Col. 2, l. 8, "30" should read -- + -- ;

Col. 4, l. 53, "mixed" should read -- mixes -- ;

Col. 4, l. 70, "0.4-6" should read -- 0.4-0.6 -- ;

Col. 6, l. 31, "+50" should read -- -50 --.

Signed and sealed this 26th day of December 1972.

(SEAL)
Attest:

EDWARD M. FLETCHER, JR.        ROBERT GOTTSCHALK
Attesting Officer               Commissioner of Patents